US007860608B2

(12) United States Patent
Lee et al.

(10) Patent No.: US 7,860,608 B2
(45) Date of Patent: Dec. 28, 2010

(54) METHOD AND APPARATUS FOR GENERATING AND TRACING CLEANING TRAJECTORY OF HOME CLEANING ROBOT

(75) Inventors: Hyoung-ki Lee, Gyeonggi-do (KR); Sun-gi Hong, Gyeonggi-do (KR); Seok-won Bang, Seoul (KR); Il-hwan Kim, Seoul (KR); Ki-wan Choi, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 921 days.

(21) Appl. No.: 10/819,984

(22) Filed: Apr. 8, 2004

(65) Prior Publication Data

US 2004/0204804 A1   Oct. 14, 2004

(30) Foreign Application Priority Data

Apr. 8, 2003  (KR) .................. 10-2003-0022094

(51) Int. Cl.
*G06F 19/00* (2006.01)
*G05B 19/04* (2006.01)
*G05B 19/18* (2006.01)

(52) U.S. Cl. .................. 700/245; 700/253; 700/254; 700/255; 901/40

(58) Field of Classification Search .......... 700/245, 700/253, 254, 255, 262, 302; 701/206, 210, 701/24, 25; 901/40
See application file for complete search history.

(56) References Cited

U.S. PATENT DOCUMENTS 4,674,048 A *  6/1987  Okumura .................. 701/25

(Continued)

FOREIGN PATENT DOCUMENTS

EP   0 502 249 A2   11/1991

(Continued)

OTHER PUBLICATIONS

J. Borenstein et al., "Mobile Robot Positioning—Sensors and Techniques", Invited paper for the Journal of Robotic Systems, Special Issue on Mobile Robots. vol. 14, No. 4, pp. 231-249.

(Continued)

*Primary Examiner*—Khoi Tran
*Assistant Examiner*—Nicholas Kiswanto
(74) *Attorney, Agent, or Firm*—Staas & Halsey LLP

(57) ABSTRACT

A method and apparatus generating and tracing a cleaning trajectory of a home cleaning robot the method including: controlling the home cleaning robot to straightly travel as much as a set distance from the docking station and then rotationally travel, maintaining the set distance from the docking station, until the home cleaning robot reaches one of two walls; controlling the home cleaning robot to travel as much as the set distance along the wall if the home cleaning robot reaches the wall and resume rotational-traveling around the docking station, maintaining a distance between the docking station and the home cleaning robot increased by the set distance until it reaches one of the two walls; and repeatedly controlling the home cleaning robot to travel as much as the set distance along the wall if the home cleaning robot reaches the wall and resume rotational-traveling around the docking station, maintaining a distance between the docking station and the home cleaning robot increased by the set distance until it reaches one of the two walls until the home cleaning robot arrives at a point where it cannot travel in a direction in which a distance between the docking station and the home cleaning robot increases.

37 Claims, 9 Drawing Sheets

U.S. PATENT DOCUMENTS

| | | | |
|---|---|---|---|
| 4,679,152 A | 7/1987 | Perdue | |
| 4,758,691 A | 7/1988 | De Bruyne | |
| 4,777,416 A | 10/1988 | George et al. | |
| 4,809,936 A | 3/1989 | Whitaker | |
| 5,307,271 A * | 4/1994 | Everett et al. | 701/24 |
| 5,646,494 A | 7/1997 | Han | |
| 5,652,593 A | 7/1997 | Rench et al. | |
| 5,794,166 A | 8/1998 | Bauer et al. | |
| 5,948,043 A | 9/1999 | Mathis | |
| 6,138,063 A | 10/2000 | Himeda | |
| 6,254,035 B1 | 7/2001 | Howard et al. | |
| 6,278,917 B1 | 8/2001 | Bauer et al. | |
| 6,308,114 B1 | 10/2001 | Kim | |
| 6,338,013 B1 | 1/2002 | Ruffner | |
| 6,370,453 B2 * | 4/2002 | Sommer | 701/23 |
| 6,415,223 B1 | 7/2002 | Lin et al. | |
| 6,438,456 B1 | 8/2002 | Feddema et al. | |
| 6,459,955 B1 | 10/2002 | Bartsch et al. | |
| 6,496,754 B2 | 12/2002 | Song et al. | |
| 6,580,246 B2 | 6/2003 | Jacobs | |
| 6,586,908 B2 | 7/2003 | Peterson et al. | |
| 6,611,234 B2 | 8/2003 | Fullerton et al. | |
| 6,615,108 B1 * | 9/2003 | Peless et al. | 700/245 |
| 6,732,826 B2 * | 5/2004 | Song et al. | 180/169 |
| 6,748,297 B2 | 6/2004 | Song et al. | |
| 7,031,805 B2 | 4/2006 | Lee et al. | |
| 7,038,589 B2 | 5/2006 | Schmidt et al. | |
| 7,173,391 B2 * | 2/2007 | Jones et al. | 318/568.12 |
| 7,188,000 B2 * | 3/2007 | Chiappetta et al. | 700/245 |
| 7,248,951 B2 * | 7/2007 | Hulden | 701/23 |
| 2002/0153185 A1 | 10/2002 | Song et al. | |
| 2003/0001777 A1 | 1/2003 | Johnson | |
| 2004/0158354 A1 | 8/2004 | Lee et al. | |
| 2004/0204804 A1 | 10/2004 | Lee et al. | |
| 2004/0211444 A1 * | 10/2004 | Taylor et al. | 134/18 |

FOREIGN PATENT DOCUMENTS

| | | | |
|---|---|---|---|
| EP | 0 502 249 A3 | 11/1991 | |
| EP | 0 732 641 A2 | 9/1996 | |
| EP | 0 732 641 A3 | 5/1997 | |
| JP | 2000-56006 | 2/2000 | |
| JP | 2001-125641 | 5/2001 | |
| KR | 2000-0066728 | 11/2000 | |
| KR | 2002-0033303 | 5/2002 | |

OTHER PUBLICATIONS

NPL—Kalman filter as Observer in autonomous robot control.

NPL—Kalm filter as Compensator for robot docking return.

U.S. Appl. No. 10/747,228, filed Dec. 30, 2003, Hyoung-ki Lee et al., Samsung Electronics Co., Ltd.

U.S. Appl. No. 10/823,548, filed Apr. 14, 2004, Hyoung-ki Lee et al., Samsung Electronics Co., Ltd.

U.S. Office Action dated Sep. 21, 2007 issued in co-pending U.S. Appl. No. 10/823,548.

U.S. Office Action dated Dec. 12, 2007 issued in co-pending U.S. Appl. No. 10/823,548.

U.S. Office Action dated Jun. 9, 2008 issued in co-pending U.S. Appl. No. 10/823,548.

U.S. Office Action dated Sep. 19, 2008 issued in co-pending U.S. Appl. No. 10/823,548.

U.S. Notice of Allowance dated Feb. 3, 2009 issued in co-pending U.S. Appl. No. 10/823,548.

U.S. Office Action dated Jun. 7, 2007 issued in co-pending U.S. Appl. No. 10/747,228.

U.S. Office Action dated Dec. 4, 2007 issued in co-pending U.S. Appl. No. 10/747,228.

U.S. Office Action dated Oct. 22, 2008 issued in co-pending U.S. Appl. No. 10/747,228.

U.S. Office Action dated Feb. 23, 2009 issued in co-pending U.S. Appl. No. 10/747,228.

European Search Report dated Sep. 9, 2004 issued for European Patent Application corresponding to co-pending U.S. Appl. No. 10/747,228.

* cited by examiner

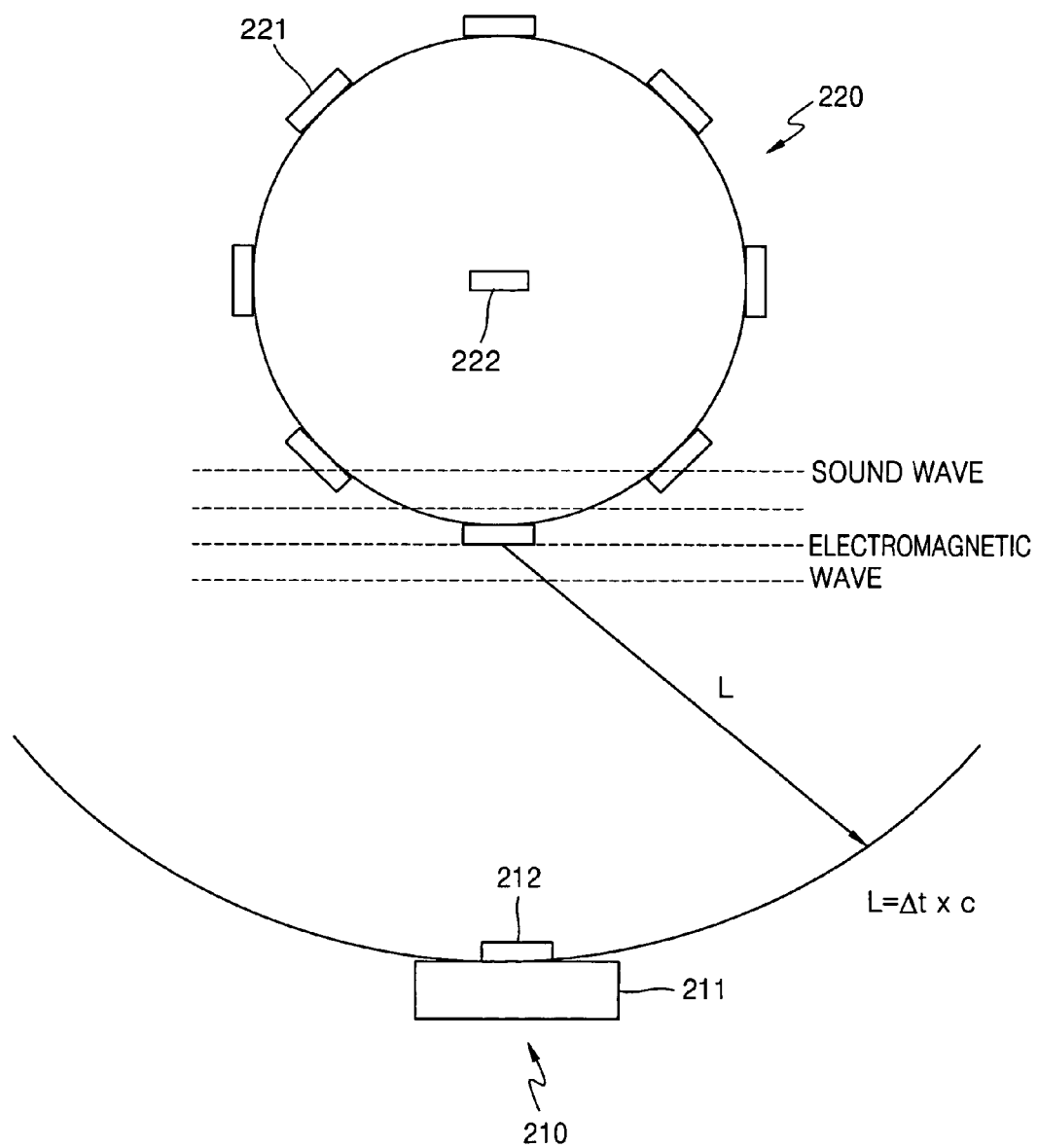

METHOD AND APPARATUS FOR GENERATING AND TRACING CLEANING TRAJECTORY OF HOME CLEANING ROBOT

CROSS-REFERENCE TO RELATED APPLICATIONS

This application claims the priority of Korean Patent Application No. 2003-22094, filed on Apr. 8, 2003, in the Korean Intellectual Property Office, the disclosure of which is incorporated herein by reference.

BACKGROUND OF THE INVENTION

1. Field of the Invention

The present invention relates to robot control, and more particularly, to a method and apparatus for generating and tracing a cleaning trajectory of a home cleaning robot that cleans a room while autonomously traveling on the floor of the room.

2. Description of the Related Art

A variety of movable robots, which generally include a driving means, sensors and a travel controller, and perform many useful functions while autonomously operating, have been developed. For example, a home cleaning robot is a cleaning device that sucks dust and dirt from the floor of a room while autonomously moving around the room without a user's manipulation. The home cleaning robot determines distances between furniture, office supplies, and walls in the room, which could be obstacles to its movement, by using its sensor and cleans the floor while controlling its movement based on determined distances to avoid collision with any of the obstacles in the room. In order to clean the entire surface of the floor, the home cleaning robot is required to continuously determine its location in the room throughout the entirety of the cleaning operation.

Techniques for a home cleaning robot to recognize its location in a predetermined cleaning zone at any given moment are disclosed in U.S. Pat. Nos. 6,338,013 and 6,138,063 and Japanese Patent Laid-open Publication No. 2000-56006. More specifically, U.S. Pat. No. 6,338,013 discloses a multifunctional movable device using a high precision positioning system that helps a home cleaning robot recognize its location while in motion. U.S. Pat. No. 6,138,063 discloses a means for helping a home cleaning robot reach any targeted location by shifting its travel direction using a gyro-sensor to detect directional angles. Japanese Patent Laid-open Publication No. 2000-56006 discloses a robot capable of precisely recognizing its location by using a transmission and reception device that communicates with a base station by transmitting signals to and receiving signals from the base station.

However, the above-mentioned techniques are somewhat expensive to implement because they presuppose additional tools, such as a plurality of beacons or gyro-sensors, to recognize the location of a home cleaning robot or to detect directional angles.

In addition, research has been carried out on a method of recognizing the location of a home cleaning robot in which pictures of surroundings are taken using a camera attached to the home cleaning robot and stored in memory. However, the amount of calculations for image processing is very large, and location recognition errors may occur whenever major or minor changes are made to the surroundings where the home cleaning robot operates. Furthermore, this method is less likely to be commercialized in the near future due to the limits of the current level of image recognition and processing technology for providing high precision images.

SUMMARY OF THE INVENTION

The present invention provides a method of generating and tracing a cleaning trajectory of a home cleaning robot that performs a cleaning operation while autonomously traveling in a predetermined cleaning zone.

The present invention also provides an apparatus that generates and traces a cleaning trajectory of a home cleaning robot that performs a cleaning operation while autonomously traveling in a predetermined cleaning zone.

According to an aspect of the present invention, there is provided a method of generating a cleaning trajectory of a home cleaning robot that includes a sound wave receptor, by using a docking station that includes a sound wave transmitter, the method including controlling the home cleaning robot to travel in a straight direction as much as a set distance from the docking station and then rotationally travel, maintaining the set distance from the docking station, until the home cleaning robot reaches one of two walls; controlling the home cleaning robot to travel as much as the set distance along the wall if the home cleaning robot reaches the wall and resume rotational-traveling around the docking station, maintaining a distance between the docking station and the home cleaning robot increased by the set distance until it reaches one of the two walls; and repeatedly controlling the home cleaning robot to travel as much as the set distance along the wall if the home cleaning robot reaches the wall and resume rotational-traveling around the docking station, maintaining a distance between the docking station and the home cleaning robot increased by the set distance until it reaches one of the two walls until the home cleaning robot arrives at a point where it cannot travel in a direction in which a distance between the docking station and the home cleaning robot increases.

According to another aspect of the present invention, there is provided a method of tracing a cleaning trajectory including: comparing the distance between the docking station and the home cleaning robot, which is measured by using a sound wave transmitted from the docking station to the home cleaning robot, with a predetermined distance that the home cleaning robot is supposed to maintain from the docking station when following the cleaning trajectory; and generating an angular velocity command so that a direction that the home cleaning robot travels is shifted based on a result of the comparison carried out in comparing the distance between the docking station and the home cleaning robot, which is measured by using the sound wave transmitted from the docking station to the home cleaning robot, with a predetermined distance that the home cleaning robot is supposed to maintain from the docking station when following the cleaning trajectory.

According to another aspect of the present invention, there is provided an apparatus that generates and traces a cleaning trajectory of a home cleaning robot, the apparatus including: a sound wave transmitter, included in a docking station; a sound wave receptor, included in the home cleaning robot; a distance calculator, which calculates a distance between the docking station and the home cleaning robot by using a difference between the time when the sound wave transmitter transmits the sound wave and the time when the sound wave receptor receives the sound wave transmitted from the sound wave transmitter; and a travel controller, which receives the distance between the docking station and the home cleaning robot from the distance calculator, controls the home cleaning robot so that the home cleaning robot travels in a straight direction as much as a set distance from the docking station, rotationally travels maintaining the set distance with the docking station until reaching one of two walls, travels in a straight direction as much as the set distance along the wall, and resumes rotational-traveling maintaining a distance between the docking station and the home cleaning robot increased by the set distance until reaching one of the two walls.

According to another aspect of the invention, there is provided an apparatus generating and tracing a traveling trajectory of a robot, the apparatus including a sound wave transmitter located at a designated location; a sound wave receptor located on the robot; a distance calculator calculating a distance between the designated location and the robot by using a difference between the time when the sound wave transmitter transmits a sound wave and the time when the sound wave receptor receives the sound wave transmitted from the sound wave transmitter; and a travel controller receiving the distance between the designated location and the robot from the distance calculator, controlling the robot so that the robot straightly travels as much as a set distance from the designated location, rotationally travels maintaining the set distance with the designated location until reaching one of two walls, straightly travels as much as the set distance along the one of the two walls, and resumes rotational-traveling maintaining a distance between the designated location and the robot increased by the set distance until reaching the other one of the two walls.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other features and advantages of the present invention will become more apparent by describing in detail exemplary embodiments thereof with reference to the attached drawings in which:

FIG. 4 is a diagram illustrating the operation of a distance calculator of FIG. 2 or 3;

DETAILED DESCRIPTION OF THE PREFERRED EMBODIMENTS

Figure 1:
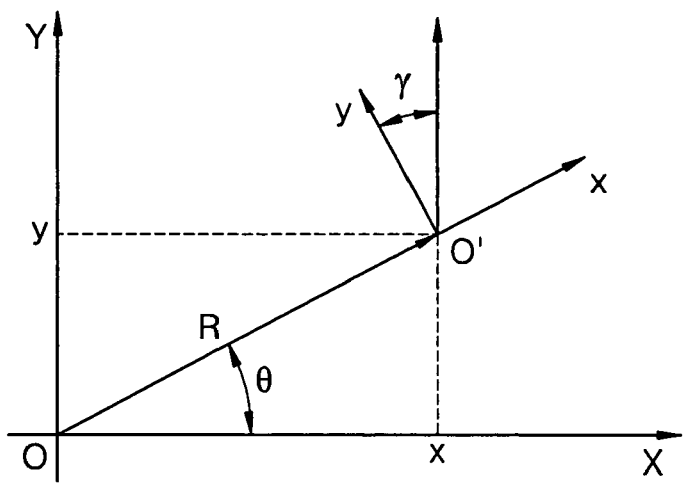
FIG. 1 is a diagram illustrating a (x, y, γ) coordinate system that represents a location of a home cleaning device and a direction in which the home cleaning robot faces.

Reference will now be made in detail to the embodiments of the present invention, examples of which are illustrated in the accompanying drawings, wherein like reference numerals refer to the like elements throughout. The embodiments are described below to explain the present invention by referring to the figures.

The present invention will be described with reference to the accompanying drawings in which exemplary embodiments of the invention are shown.

FIG. 1 is a diagram illustrating a (x, y, γ) coordinate system that represents a location of a home cleaning robot and a direction in which the home cleaning robot faces. In FIG. 1, the origin O, represents a location of a docking station, (x, y) represents a current location of a home cleaning robot, and y represents a direction in which the home cleaning robot faces. (x, y) may possibly be replaced by curvilinear coordinates (R, θ).

Figure 2:
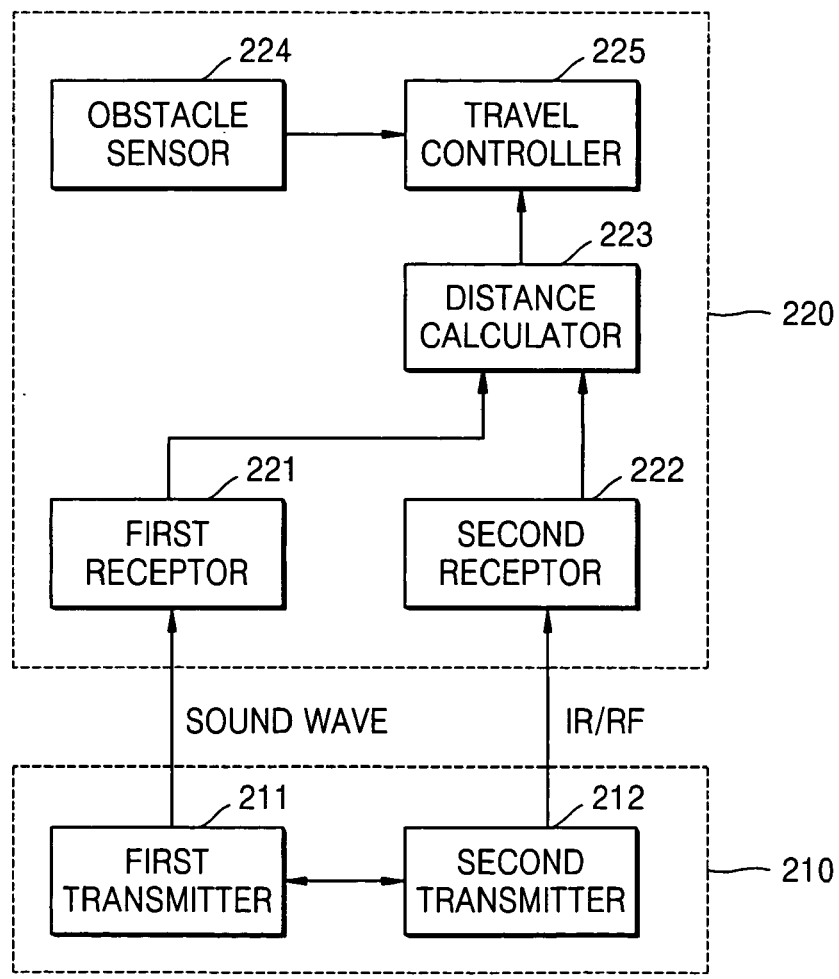
FIG. 2 is a block diagram illustrating an apparatus that generates and traces a cleaning trajectory of a home cleaning robot according to a first embodiment of the present invention.

FIG. 2 is a block diagram illustrating an apparatus that generates and traces a cleaning trajectory of a home cleaning robot according to a first embodiment of the present invention. Referring to FIG. 2, the apparatus includes a docking station 210 and a home cleaning robot 220. The docking station includes first and second transmitters 211 and 212, and the home cleaning robot 220 includes first and second receptors 221 and 222, a distance calculator 223, an obstacle sensor 224, and a travel controller 225.

The first transmitter 211 of the docking station 210 generates a sound wave to detect a location of the home cleaning robot 220. When the sound wave is generated and transmitted from the first transmitter 211, the second transmitter 212 generates and transmits a time synchronization signal. The speed of the transmission of the time synchronization signal is much faster than the speed of the transmission of the sound wave. In this respect, the time synchronization signal may be either an infrared (IR) signal or a radio frequency (RF) signal, and the sound wave generated by the first transmitter 211 could be an ultrasonic wave.

In the home cleaning robot 220, the first receptor 221, which includes an all-directional sound wave sensor, receives the sound wave transmitted from the first transmitter 211 of the docking station 210. The second receptor 222 receives the time synchronization signal transmitted from the second transmitter 212 of the docking station 210. The distance calculator 223 calculates a distance between the first transmitter 211 and the first receptor 221, i.e., a distance between the docking station 210 and the home cleaning robot 220, based on a gap between the time when the second receptor 222 receives the time synchronization signal and the time when the first receptor 221 receives the sound wave.

In the obstacle sensor 224, at least one pair of an infrared ray emitting device and an infrared ray receiving device is fixed onto and arranged along the circumference of the home cleaning robot 220. The obstacle sensor 224 may be an ultrasonic sensor that emits an ultrasonic wave and receives its reflection. The obstacle sensor 224 measures a distance between the home cleaning robot 220 and a predetermined obstacle, such as a wall.

The travel controller 225 receives the calculated distance between the docking station 210 and the home cleaning robot 220 from the distance calculator 223 and also receives, from the obstacle sensor 224, a sensing result indicating whether or not the home cleaning robot 220 has encountered an obstacle. Thereafter, the travel controller 225 generates a cleaning trajectory in the following manner. The travel controller 225 controls the home cleaning robot 220 so that the home cleaning robot 220 travels in a straight line a predetermined set distance from the docking station 210, and then rotationally travels maintaining the predetermined set distance from the docking station 210, until encountering a wall. If the home cleaning robot 220 encounters the wall, the travel controller 225 controls the home cleaning robot 220 so that the home cleaning robot 220 travels along the wall by as much as the predetermined set distance and then resumes rotational-traveling, maintaining twice the predetermined set distance with the docking station 210, until it encounters another wall. That is, until it encounters a wall, the home cleaning robot 220 rotationally travels maintaining a distance from the docking station 210 equal to a multiple of the predetermined set distance. Thereafter, if the home cleaning robot 220 encounters a wall, the home cleaning robot 220 travels along the wall by as much as the predetermined set distance and resumes rotational-traveling maintaining a distance from the docking station 210 equal to the sum of the predetermined set distance and the distance between the home cleaning robot 220 and the docking station 210 before it has encountered the wall. If the home cleaning robot 220 arrives at a point from which it cannot go further along a wall or must travel in a direction in which the distance between the docking station 210 and the home cleaning robot 220 decreases, the travel controller 225 terminates cleaning operation of the home cleaning robot 220.

Figure 3:
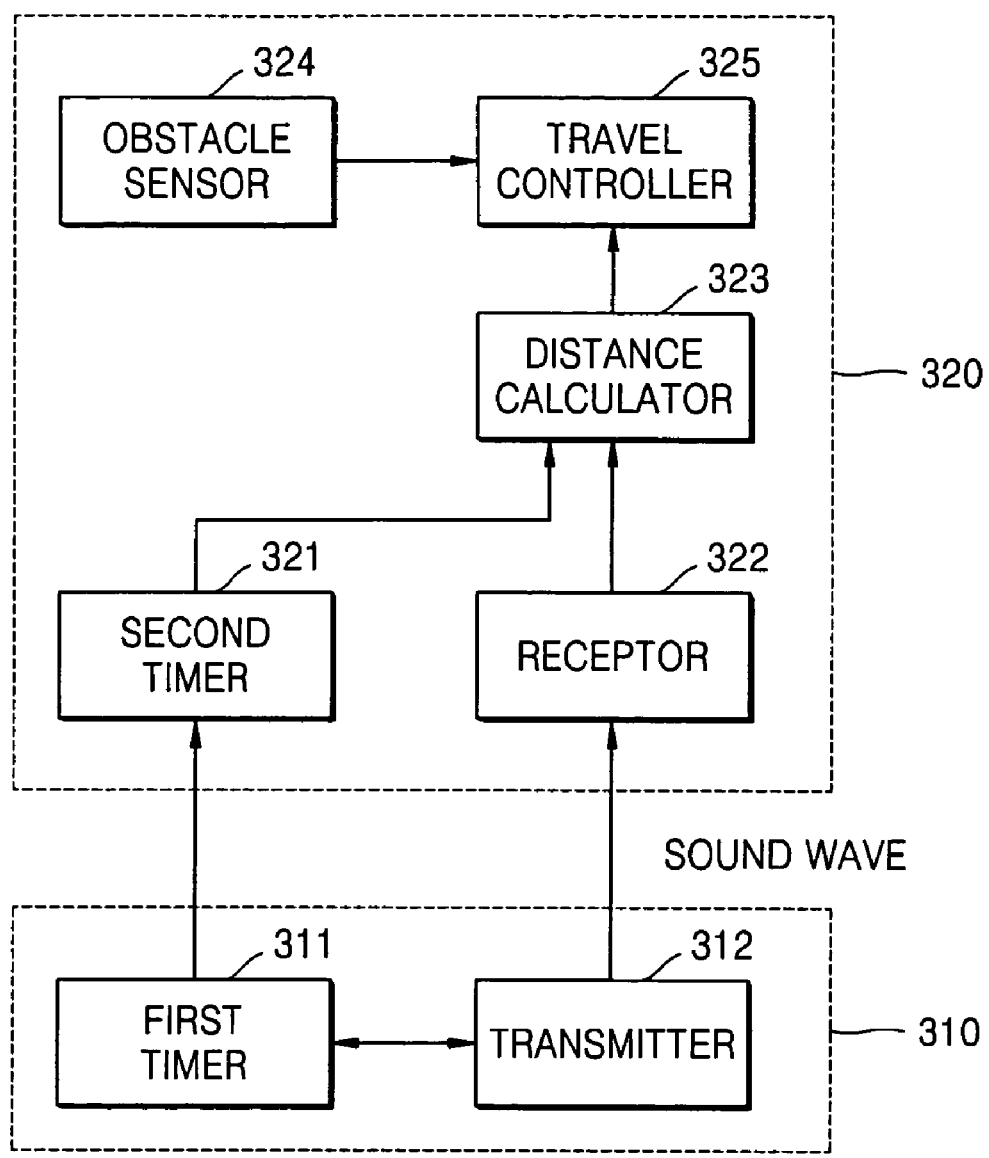
FIG. 3 is a block diagram illustrating an apparatus that generates and traces a cleaning trajectory of a home cleaning robot according to second embodiment of the present invention.

FIG. 3 is a block diagram illustrating an apparatus that generates and traces a cleaning trajectory of a home cleaning robot according to a second embodiment of the present invention. Referring to FIG. 3, the apparatus includes a docking station 310 and a home cleaning robot 320. The docking station 310 includes a first timer 311 and a transmitter 312, and home cleaning robot 320 includes a second timer 321, a receptor 322, a distance calculator 323, an obstacle sensor 324, and a travel controller 325.

In the present embodiment, the first and second timers 311 and 321 are used instead of the second transmitter 212 and the second receptor 222, respectively. In the previous embodiment, the second transmitter 212 transmits a time synchronization signal to the second receptor 222, and the second receptor 222 receives the time synchronization signal from the second transmitter 212. In the present embodiment, the first and second timers 311 and 321 may be separate elements or may be replaced by a microprocessor that constitutes the travel controller 325 and serves timer functions. The obstacle sensor 324 and the travel controller 325 are the same as their respective counterparts of FIG. 2, and thus their descriptions will not be repeated here. Therefore, detailed descriptions of only the first and second timers 311 and 321, the transmitter 312, the receptor 322, and the distance calculator 323, will be presented.

The transmitter 312 of the docking station 310 generates a sound wave in synchronization with a timing signal generated by the first timer 311 and transmits the sound wave to detect a location of the home cleaning robot 320. The first timer 311 generates the timing signal, which is comprised of a series of pulses, so that the transmitter 312 can generate sound waves at predetermined time intervals.

The receptor 322, which is, for example, an all-directional sound wave sensor of the home cleaning robot 320, receives the sound wave transmitted from the transmitter 312 of the docking station 310. The second timer 321 generates the same timing signal as the first timer 311 and outputs it to the distance calculator 323. The distance calculator 323 calculates a distance between the transmitter 312 and the receptor 322, i.e., a distance between the docking station 310 and the home cleaning robot 320, based on a difference between the time when the second timer 321 generates the timing signal and the time when the receptor 322 receives the sound wave from the transmitter 312.

FIG. 4 is a diagram illustrating the operation of the distance calculator 223 of FIG. 2 or the distance calculator 323 of FIG. 3. The distance calculator 223 receives the time, that is, a first time when the first receptor 221 receives a sound wave from the first transmitter 211 and the time, that is a second time when the second receptor 222 receives a time synchronization signal from the second transmitter 212, calculates a difference Δt between the first time and the second time and then calculates a distance L between the docking station 210 and the home cleaning robot 220 using this difference Δt.

$$L = \Delta t \cdot c \qquad (1)$$

where, c is the speed of sound, i.e., 340 m/sec.

In other words, when the first and second transmitters 211 and 212 of the docking station 210 transmit a sound wave and a time synchronization signal, respectively, the distance calculator 223 receives a signal indicating a first time when the first receptor 221 receives the sound wave and receives a signal indicating a second time when the second receptor 222 receives the time synchronization signal and calculates the distance L between the home cleaning robot 220 and the docking station 210 by calculating the difference Δt between the two times and multiplying Δt by c.

On the other hand, the distance calculator 323 of FIG. 3 receives a signal indicating a first time when the receptor 332 receives a sound wave and a signal indicating a second time when the second timer 321 generates the same timing signal as that provided by the first timer 311 and calculates the distance L between the home cleaning robot 320 and the docking station 310 based on a difference Δt between these two times by using Equation (1). In other words, if the sound wave is transmitted from the transmitter 312 to the receptor 322 in synchronization with the timing signal provided by the first timer 311, the distance calculator 323 calculates the distance L between the home cleaning robot 320 and the docking station 310 by calculating the difference Δt and multiplying Δt by c.

Figure 5A:
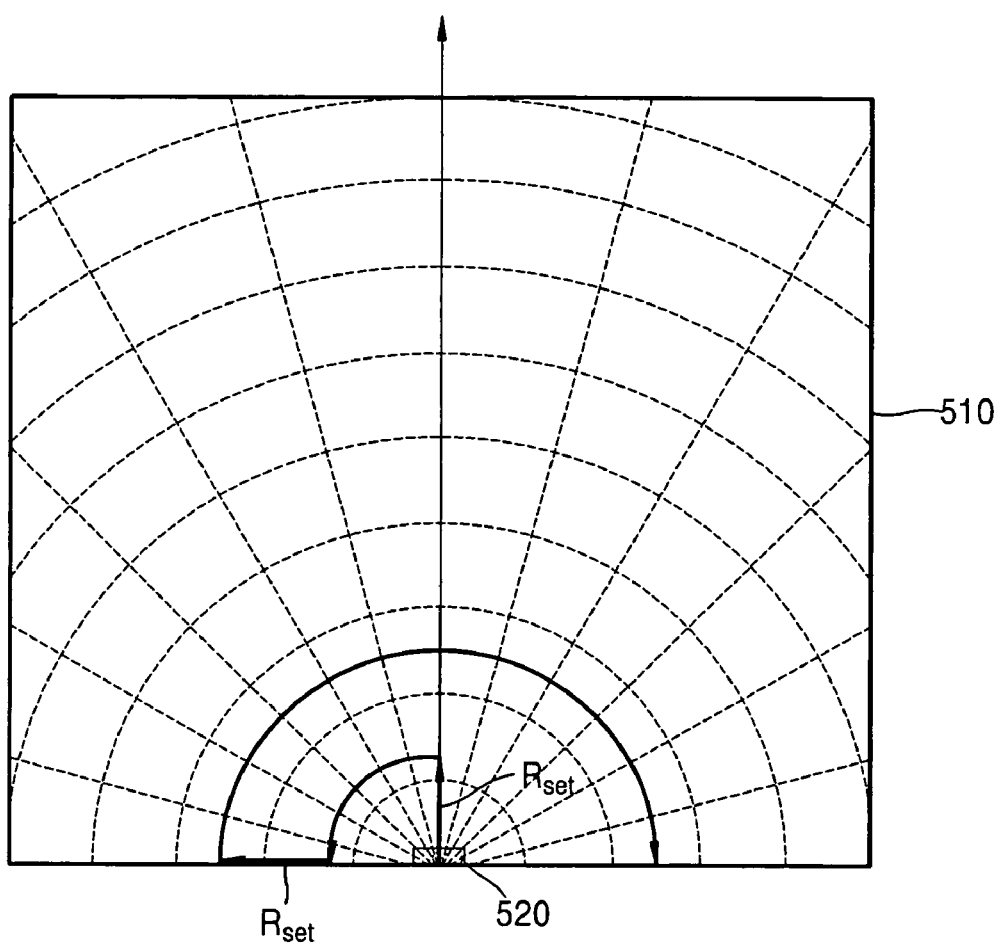
FIGS. 5A and 5B are diagrams illustrating a method of generating and tracing a cleaning trajectory of a home cleaning robot according to a third embodiment of the present invention.
Figure 5B:
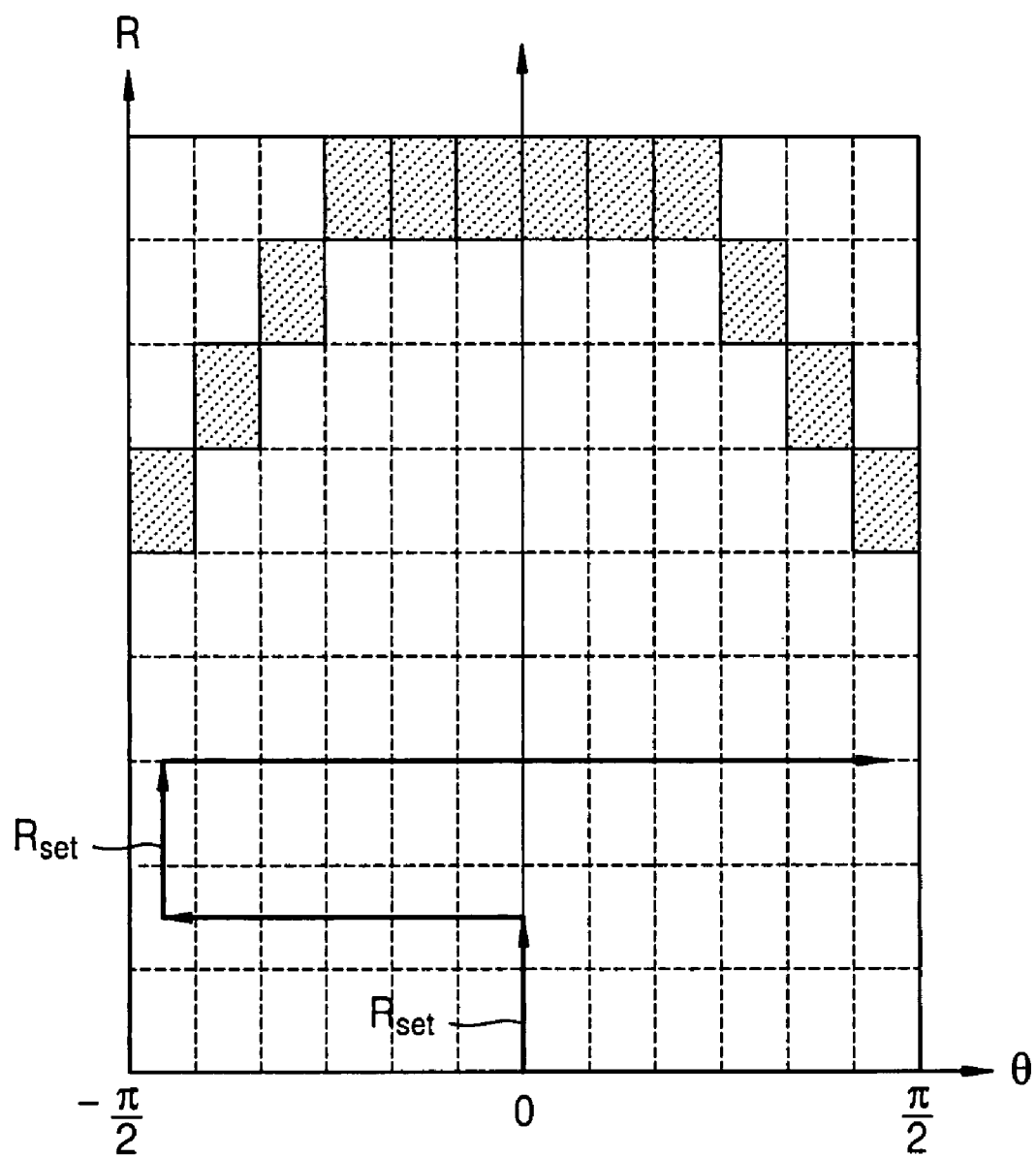

FIGS. 5A and 5B are diagrams illustrating a method of generating a cleaning trajectory of a home cleaning robot according to a third embodiment of the present invention. More specifically, FIG. 5A illustrates a cleaning trajectory of a home cleaning robot when a cleaning zone 510 has a rectangular shape. When a cleaning operation is initiated, the home cleaning robot travels in a straight line a set distance $R_{set}$ from a docking station 520 and rotationally travels, maintaining the set distance $R_{set}$ from the docking station 520, thus forming a first semicircular cleaning trajectory. If the home cleaning robot encounters a wall while rotationally travelling, the home cleaning robot travels the set distance $R_{set}$ along the wall such that the distance between the home cleaning robot and the docking station 520 increases to twice the set distance $R_{set}$ and then resumes rotational-travelling, maintaining twice the set distance $R_{set}$ from the docking station 520, thus forming a second semicircular cleaning trajectory. In this manner, third through n-th semicircular cleaning trajectories are sequentially generated. Accordingly, the distance between the home cleaning robot and the docking station 52 increases from $R_{set}$ to $2R_{set}$, from $2R_{set}$ to $3R_{set}$, ..., from $(n-1)R_{set}$ to nR$_{set}$. FIG. 5B is a diagram illustrating the cleaning trajectory of FIG. 5A is an R-θ coordinate system.

Figure 6:
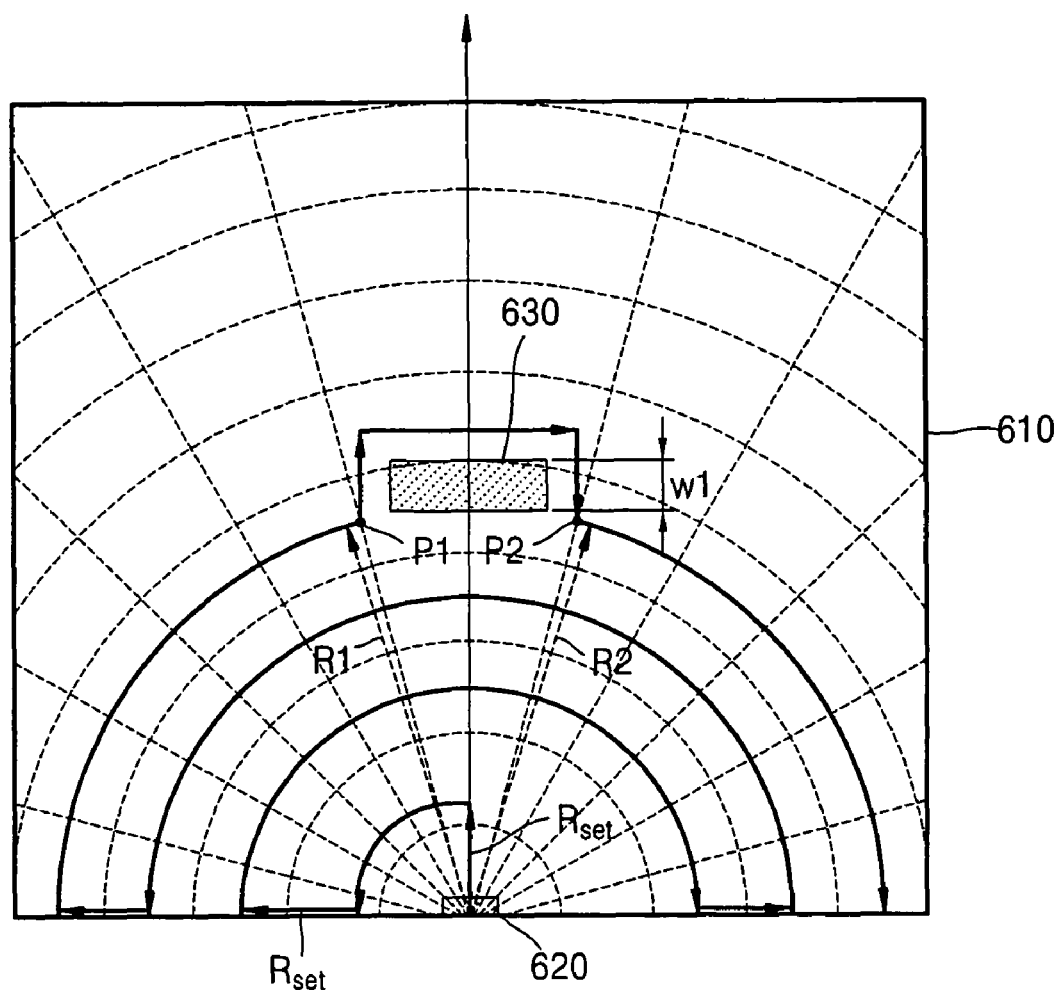
FIG. 6 is a diagram illustrating a method of generating and tracing a cleaning trajectory of a home cleaning robot when a home cleaning robot encounters a first type obstacle while following a predetermined cleaning trajectory according to a fourth embodiment of the present invention.

FIG. 6 is a diagram illustrating a method of generating and tracing a cleaning trajectory of a home cleaning robot when a home cleaning robot encounters a first type obstacle while following a predetermined cleaning trajectory according to a fourth embodiment of the present invention. The first type obstacle indicates an obstacle whose width w1 is smaller than a set distance R$_{set}$. Referring to FIG. 6, it is assumed that a home cleaning robot encounters an obstacle 630 while performing a cleaning operation in a predetermined cleaning zone 610, which is substantially rectangular-shaped, by following a predetermined cleaning trajectory that begins at the docking station 620. When the home cleaning robot arrives at a point P1 while rotational-traveling, the obstacle sensor 224 of the home cleaning robot senses the obstacle 630. The point P1 is a distance R1 from the docking station 620. If the obstacle sensor 224 senses the obstacle 630 at the point P1, the home cleaning robot travels as much as the set distance R$_{set}$ along the obstacle 630 such that the distance between the home cleaning robot and the docking station 620 increases, i.e., in a vertical direction. When the home cleaning robot reaches a point where the distance between the home cleaning robot and the docking station 620 is R1+R$_{set}$, the home cleaning robot is farther away from the docking station 620 than the obstacle 630, and the home cleaning robot travels along the obstacle 630 by the same method such as a wall-following method until it reaches a point P2 where a distance R2 between the docking station 620 and the home cleaning robot is the same as the distance R1 from the docking station 620 and the home cleaning robot at the point P1. The home cleaning robot then resumes rotational-traveling maintaining the distance R1 from the docking station 620 until it encounters a wall.

Figure 7:
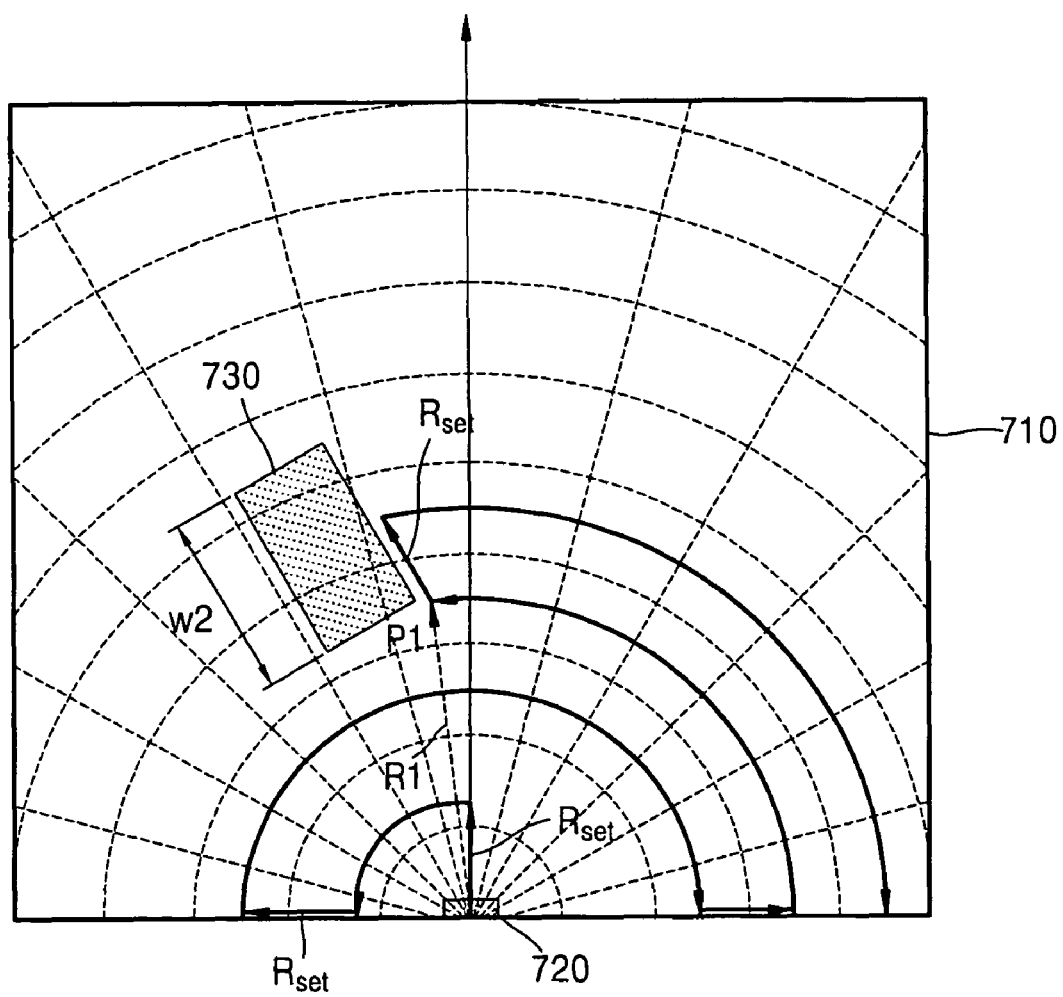
FIG. 7 is a diagram illustrating a method of generating and tracing a cleaning trajectory of a home cleaning robot when a home cleaning robot encounters a second type obstacle while following a predetermined cleaning trajectory according to a fifth embodiment of the present invention.

FIG. 7 is a diagram illustrating a method of generating and tracing a cleaning trajectory of a home cleaning robot when a home cleaning robot encounters a second type obstacle while following a predetermined cleaning trajectory according to a fifth embodiment of the present invention. Here, the second type obstacle indicates an obstacle whose width w2 is greater than a set distance R$_{set}$. Referring to FIG. 7, it is assumed that a home cleaning robot encounters an obstacle 730 while performing a cleaning operation in a predetermined cleaning zone 710, which is substantially rectangular-shaped, by following a predetermined cleaning trajectory that begins at a docking station 720. When the home cleaning robot arrives at a point P1 while rotationally traveling, the obstacle sensor 224 of the home cleaning robot senses the obstacle 730. The point P1 is a distance R1 from the docking station 720. If the obstacle sensor 224 senses the obstacle 730 at the point P1, the home cleaning robot travels as much as the set distance R$_{set}$ along the obstacle 730 such that the distance between the home cleaning robot and the docking station 720 increases, i.e., in a radial direction. When the home cleaning robot reaches a point where the distance between the home cleaning robot and the docking station 720 is equal to R1+R$_{set}$, the home cleaning robot cannot travel in its original direction beyond the obstacle 730, and the home cleaning robot rotationally travels in a direction opposite to the direction in which it traveled when it initially encountered the obstacle 730, maintaining a distance R1+R$_{set}$ from the docking station 720 until it encounters a wall.

Figure 8:
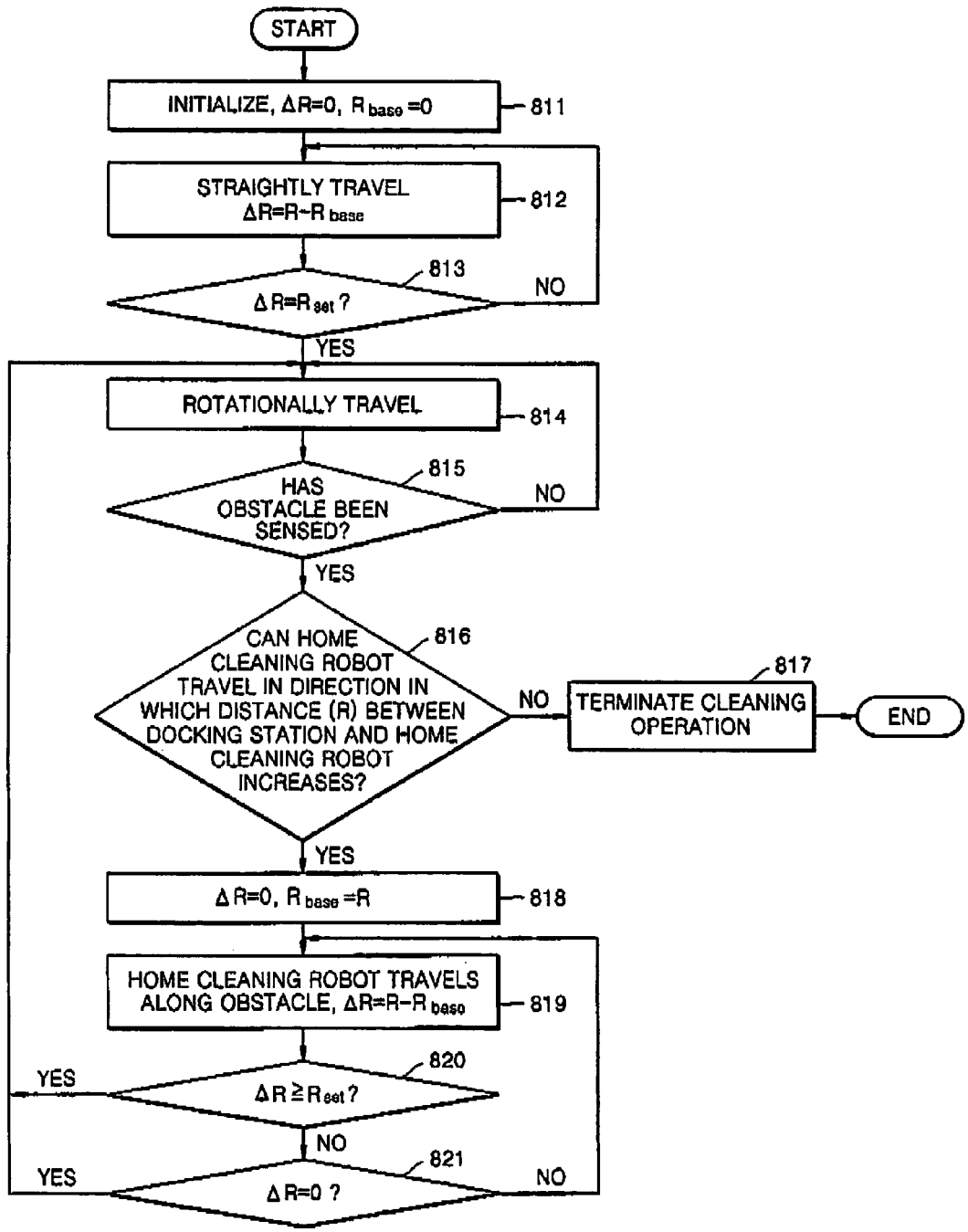
FIG. 8 is a flowchart illustrating a method of generating a cleaning trajectory of a home cleaning robot according to a sixth embodiment of the present invention.

FIG. 8 is a flowchart illustrating a method of generating a cleaning trajectory of a home cleaning robot according to a sixth embodiment of the present invention. Initially, the home cleaning robot 220 is placed in contact with the docking station 210. In operation 811, if a user orders the home cleaning robot 220 to carry out a cleaning operation by using a manipulation unit (not shown) attached to the home cleaning robot 220 or a remote controller (not shown), a set distance R$_{set}$ is set, and a distance traveled ΔR and a distance R$_{base}$ between the home cleaning robot 220 and the docking station 210 are initialized. In operation 812, the home cleaning robot 220 is controlled so that it travels in a straight line from the docking station 210, and the radial distance ΔR is calculated based on a calculated distance R between the home cleaning robot 220 and the docking station 210 obtained by the distance calculator 223 of the home cleaning robot 220.

In operation 813, it is determined whether or not the distance traveled ΔR, obtained in operation 812, is equal to the set distance R$_{set}$. If the distance traveled ΔR is not equal to the set distance R$_{set}$, operation 812 is repeated until the distance traveled ΔR is equal to the set distance R$_{set}$. If the distance traveled ΔR is equal to the set distance R$_{set}$, the home cleaning robot 220 is controlled in operation 814 to rotationally travel, in an arbitrary direction, maintaining the set distance R$_{set}$ from the docking station 210.

In operation 815, it is determined, based on the output of the obstacle sensor 224, whether an obstacle has been sensed by the obstacle sensor 224 while the home cleaning robot 220 rotationally travels maintaining the set distance R$_{set}$ from the docking station 210. If an obstacle has not been sensed, operation 814 is repeated so that the home cleaning robot 220 continues to rotationally travel, maintaining the set distance R$_{set}$ from the docking station 210. On the other hand, if an obstacle has been sensed by the obstacle sensor 224 at a point P1, it is determined whether the home cleaning robot 220 can travel straight further from the point P1 along the obstacle in a direction in which the distance R between the home cleaning robot 220 and the docking station 210 increases by calculating the distance R between the home cleaning robot 220 and the docking station 210.

If it is determined, in operation 816, that the home cleaning robot 220 cannot travel along the obstacle in a direction in which the distance R between the docking station 210 and the home cleaning robot 220 increases, it is determined that the cleaning operation is completed, and thus the cleaning operation is terminated in operation 817. If it is determined, in operation 816, that the home cleaning robot 220 can travel along the obstacle in a direction in which the distance R between the docking station 210 and the home cleaning robot 220 increases, the distance traveled ΔR is set to '0', and R$_{base}$ is set as the distance R between the docking station 210 and the home cleaning robot 220, in operation 818. In operation 819, the home cleaning robot 220 is controlled so that it travels in a straight line along the obstacle in the direction where the distance R between the docking station 210 and the home cleaning robot 220 increases.

If it is determined in operation 819 that the distance travelled ΔR is not less than the set distance R$_{set}$, it is determined in operation 820 that the obstacle sensed in operation 815, like the obstacle 730 of FIG. 7, extends in a radial direction from the docking station 210 or that the home cleaning robot 220 encounters a wall, and operation 814 is repeated. At this time, the distance R between the docking station 210 and the home cleaning robot 220 is equal to the sum of the set distance R$_{set}$ and a distance R1 between the docking station 210 and the home cleaning robot 220 at the point P1 where the obstacle had been sensed. If the distance travelled ΔR is less than the set distance R$_{set}$ in operation 819, it is determined, in operation 821, that the obstacle sensed in operation 815, like the obstacle 630 of FIG. 6, extends along a tangent of a circle centered at the docking station, and the home cleaning robot 220 is controlled to travel along the obstacle. Thereafter, it is determined whether the home cleaning robot 220 has arrived at a point P2 where a distance R2 between the docking station 210 and the home cleaning robot 220 is the same as the distance R1 between the docking station 210 and the point P1, i.e., whether or not the change in the distance ΔR is equal to 0. If it is determined that the home cleaning robot 220 has arrived at the point P2, operation 814 is repeated, and the home cleaning robot 220 is controlled to rotationally travel, thus maintaining the distance P1 from the docking station 210 as R1.

Figure 9:
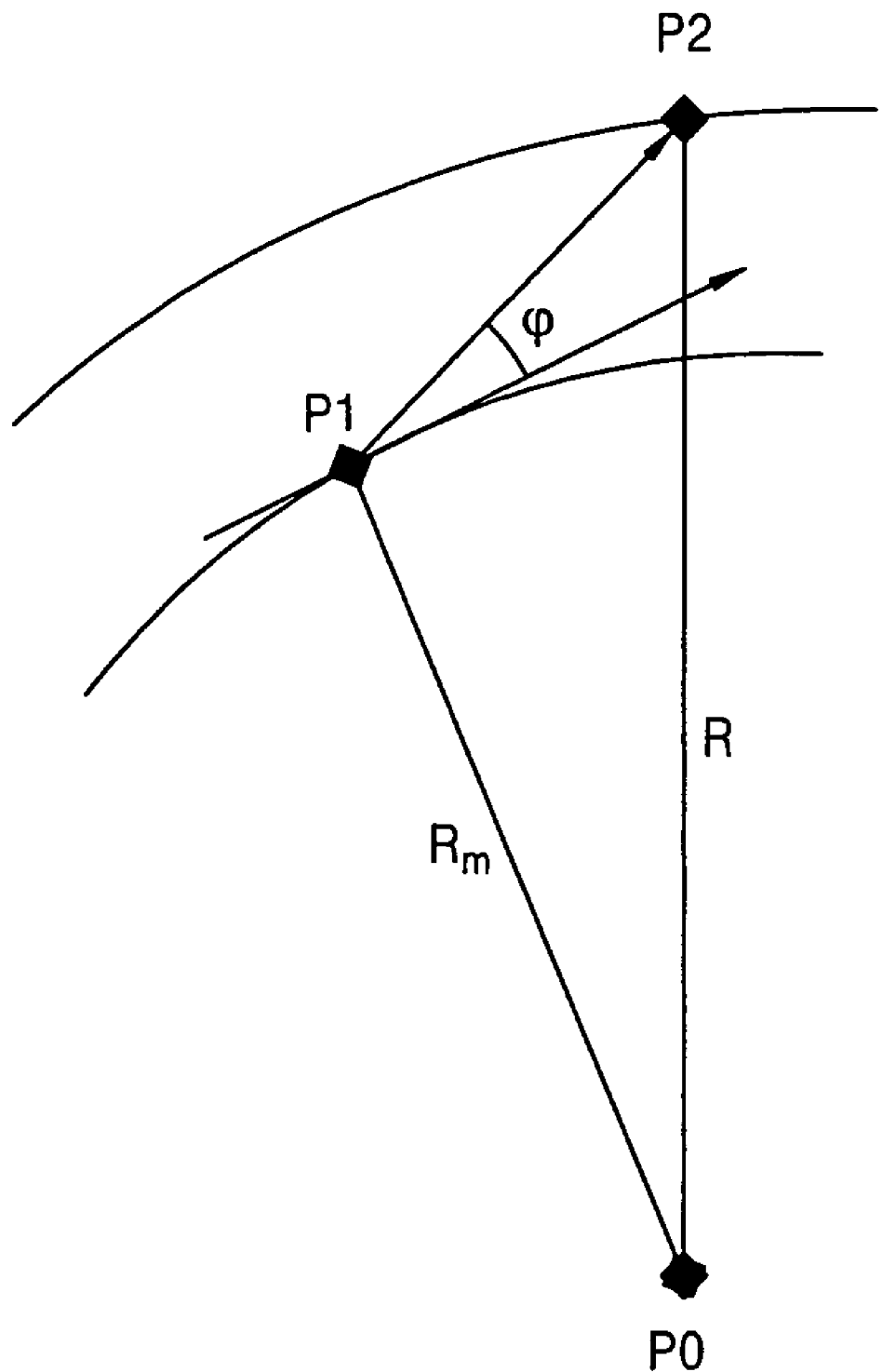
FIG. 9 is a diagram illustrating a method of tracing a cleaning trajectory of a home cleaning robot according to a seventh embodiment of the present invention.

FIG. 9 is a diagram illustrating a method of tracing a cleaning trajectory of a home cleaning robot according to a seventh embodiment of the present invention. Referring to FIG. 9, P0 represents a location of the docking station 210, a point P1 represents a location of the home cleaning robot 220 that rotationally travels following a desired cleaning trajectory, and a point P2 represents a location of the home cleaning robot 220 after failing to follow the desired cleaning trajectory. In addition, $R_m$ represents a set distance that the home cleaning robot 220 is supposed to maintain from the docking station 210 while rotationally traveling by following the desired cleaning trajectory, and R represents a distance between the docking station 210 and the point P2, which is calculated by the distance calculator 223.

The trajectory of the home cleaning robot 220 can be expressed using Equation (2) below, adopting the (x, y, γ) coordinate system of FIG. 1.

$$\dot{x}(t)=v(t)\cos\gamma(t) \quad (2)$$

$$\dot{y}(t)=v(t)\sin\gamma(t)$$

$$\dot{\gamma}(t)=w(t)$$

In Equation (2), v(t) represents a linear velocity command, and w(t) represents an angular velocity command. In a desired system, the command values of a location and direction match the actual travel distance and direction.

Referring to FIG. 9, when the home cleaning robot 220 arrives at the point P2 from the point P1, the travel direction of the home cleaning robot 220 is shifted by an angle φ so that the home cleaning robot 220 can resume rotation by following a cleaning trajectory that it used to follow before it arrived at the point P1, a process which is expressed by Equation (3) below.

$$v(t)=C_1 \quad (3)$$

$$w(t)=C_2*\text{sgn}(R_m-R)$$

In Equation (3), each of $C_1$ and $C_2$ is a predetermined constant, respectively, and sgn(*) is a sign function. That is, if * has a number greater than 0, sign function returns to 1 and if * has a number smaller than 0, sign function returns to −1. Furthermore, if * has a number equal to 0, sign function returns to 0.

In other words, at a predetermined location, the travel controller 225 receives the calculated distance $R_m$ between the docking station 210 and the home cleaning robot 220 from the distance calculator 223, compares the calculated distance R with the distance $R_m$ that the home cleaning robot 220 is supposed to maintain from the docking station 210 at the predetermined location, and shifts the angular velocity w(t) of the home cleaning robot 220 based on whether or not $R_m$ is larger than R.

The aforementioned method of generating a cleaning trajectory of a home cleaning robot using a docking station may be embodied as a computer program that can be run by a computer, which can be a general or special purpose computer. Thus, it is understood that the robot and/or the docking station can be such a computer. Computer programmers in the art can easily reason codes and code segments, which constitute the computer program. The program is stored in a computer readable medium readable by the computer. When the program is read and run by a computer, the method of controlling the robot is performed. The computer-readable recording medium includes nearly all types of recording devices. For example, the computer-readable recording medium includes a ROM, a RAM, a CD-ROM, a magnetic tape, a floppy disk, an optical data storage device, and a carrier wave (such as data transmission through the Internet). In addition, the computer-readable recording medium can be distributed over a plurality of computer systems which are connected to one another in a network so that computer-readable codes are stored on the computer-readable recording medium in a decentralized manner. In the meantime, functional programs, codes, and code segments for realizing the present invention can be easily obtained by programmers in the art.

As described above, in exemplary embodiments of the present invention, a docking station and a home cleaning robot include a sound wave generator and a sound wave receptor, respectively. Thus, a distance between the docking station and the home cleaning robot can be calculated by using sound waves transmitted between the docking station and the home cleaning robot without additionally installing a device on a wall or ceiling of a predetermined cleaning zone. In addition, it is possible to create a cleaning trajectory that the home cleaning robot is supposed to follow while operating by using the calculated distance between the docking station and the home cleaning robot. Moreover, it is possible to implement a system at a lower cost by simply controlling the home cleaning robot to follow the created cleaning trajectory.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of generating a cleaning trajectory of a home cleaning robot that includes at least one sound wave receptor by using a docking station that includes at least one sound wave transmitter, the method comprising:

controlling the home cleaning robot, using at least one processing device, to travel in a straight direction, substantially perpendicular to a barrier to which the docking station is attached, as much as a set distance from the docking station and then to rotationally travel, maintaining the set distance from the docking station, until the home cleaning robot reaches one of a leftmost barrier and a rightmost barrier with respect to the straight direction;

controlling the home cleaning robot, using at least one processing device, to travel as much as the set distance along the leftmost barrier or the rightmost barrier if the home cleaning robot reaches the leftmost barrier or the rightmost barrier and resume rotational-traveling around the docking station, maintaining a distance between the docking station and the home cleaning robot increased by the set distance until the home cleaning robot reaches the one of the leftmost barrier and the rightmost barrier;

repeatedly controlling the home cleaning robot, using at least one processing device, to travel as much as the set distance along the one of the leftmost barrier or the rightmost barrier if the home cleaning robot reaches the one of the leftmost barrier or the rightmost barrier and resumes rotational-traveling around the docking station, maintaining a distance between the docking station and the home cleaning robot increased by the set distance until the home cleaning robot reaches the other one of the leftmost barrier and the rightmost barrier, until the home cleaning robot arrives at a point where the home cleaning robot cannot travel in a direction in which a distance between the docking station and the home cleaning robot increases.

2. The method of claim 1, wherein the distance between the docking station and the home cleaning robot is calculated based on a difference between a time when the sound wave transmitter transmits a sound wave and a time when the sound receptor receives the sound wave transmitted from the sound wave transmitter.

3. The method of claim 1, wherein if an obstacle is sensed at a point while the home cleaning robot rotationally travels, the home cleaning robot travels as much as a predetermined distance along the obstacle, and if the predetermined distance is not less than the set distance, the home cleaning robot rotationally travels, maintaining a distance from the docking station equal to the set distance plus a distance between the docking station and the home cleaning robot at the predetermined point where the obstacle had been sensed.

4. The method of claim 2, wherein the difference between the time when the sound wave transmitter transmits the sound wave and the time when the sound wave receptor receives the sound wave transmitted from the sound wave transmitter is measured based on a difference between the time when a predetermined time synchronization signal transmitted from the docking station is received by the home cleaning robot and the time when the sound wave is received by the sound wave receptor.

5. The method of claim 2, wherein the difference between the time when the sound wave transmitter transmits the sound wave and the time when the sound wave receptor receives the sound wave transmitted from the sound wave transmitter is measured based on a predetermined timing signal.

6. The method of claim 1, wherein a program enabling the method is recorded on a computer-readable recording medium.

7. The method of claim 3, wherein a program enabling the method is recorded on a computer-readable recording medium.

8. The method of claim 1, wherein if the home cleaning robot senses an obstacle at a predetermined point during the home cleaning, the home cleaning robot travels as much as a predetermined distance along the obstacle, and if the predetermined distance is less than the set distance, the home cleaning robot is controlled to travel along the obstacle until it arrives at a point where a distance between the docking station and the home cleaning robot is the same as a distance between the docking station and the home cleaning robot at the predetermined point where the obstacle has been sensed and then rotationally travels maintaining a distance between the docking station and the home cleaning robot.

9. The method of claim 1, further including tracing the cleaning trajectory by:
measuring a distance between the docking station and the home cleaning robot using the sound wave transmitted from the docking station to the home cleaning robot;
comparing the distance between the docking station and the home cleaning robot with a predetermined distance; and
adjusting the cleaning trajectory by generating an angular velocity command to maintain the distance between the docking station and the home cleaning robot within the predetermined distance.

10. The method of tracing of claim 9, wherein the distance between the docking station and the home cleaning robot is calculated based on a difference between the time when the sound wave transmitter transmits a sound wave to the sound wave receptor and the time when the sound receptor receives the sound wave transmitted from the sound wave transmitter.

11. The method of tracing of claim 9, wherein a program enabling the method is recorded on a computer-readable recording medium.

12. The method of claim 1, wherein the cleaning trajectory of the home cleaning robot is expressed by the following equation:

$$\dot{x}(t)=v(t)\cos\gamma(t)$$
$$\dot{y}(t)=v(t)\sin\gamma(t)$$
$$\dot{\gamma}(t)=w(t),$$

wherein v(t) represents a linear velocity command, and w(t) represents an angular velocity command.

13. A mobile robot comprising:
at least one sound wave receptor which receives a sound wave transmitted from a docking station;
a distance calculator, which calculates a distance between the docking station and the mobile robot by using a difference between the time when docking station transmits the sound wave and the time when the sound wave receptor receives the sound wave transmitted from the docking station; and
a travel controller, which receives the distance between the docking station and the mobile robot from the distance calculator, controls the mobile robot so that the mobile robot travels in a straight direction, substantially perpendicular to a barrier to which the docking station is attached, as much as a set distance from the docking station, rotationally travels maintaining the set distance with the docking station until reaching one of a leftmost and a rightmost barrier with respect to the straight direction, straightly travels as much as the set distance along the one of the leftmost barrier and the rightmost barrier, resumes rotational-traveling maintaining a distance between the docking station and the mobile robot increased by the set distance until reaching the other one of the leftmost barrier and the rightmost barrier.

14. The mobile robot of claim 13, wherein the travel controller outputs an angular velocity command by using a difference between the docking station and the mobile robot, received from the distance calculator, and a predetermined distance that the mobile robot is supposed to maintain from the docking station when following a predetermined cleaning trajectory, such that the mobile robot returns to the predetermined cleaning trajectory.

15. The mobile robot of claim 13, wherein the travel controller receives a calculated distance Rm between the docking station and the mobile robot from the distance calculator, compares a calculated distance R with the distance Rm that the mobile robot is to maintain from the docking station at a predetermined location, and shifts an angular velocity w(t) of the mobile robot based on whether or not Rm is larger than R.

16. The mobile robot of claim 13, wherein if the mobile robot senses an obstacle at a predetermined point, the mobile robot travels as much as a predetermined distance along the obstacle, and if the predetermined distance is not less than the set distance, the mobile robot rotationally travels, maintaining a distance from the docking station equal to the set distance plus a distance between the docking station and the mobile robot at the predetermined point where the obstacle had been sensed.

17. The mobile robot of claim 13, further comprising:
a time synchronization signal receptor which receives a time synchronization signal transmitted from the docking station.

18. The mobile robot of claim 13, further comprising:
a timer which is included in the mobile robot and generates the same timing signal as that provided from the docking station.

19. The mobile robot of claim 17, wherein the sound wave is an ultrasonic wave.

20. The mobile robot of claim 17, wherein the time synchronization signal is one of an infrared signal and a radio frequency signal.

21. The mobile robot of claim 13, wherein the sound wave receptor which is included in the mobile robot is an all-directional sound wave sensor.

22. A computer readable medium encoded with processing instructions for performing a method of generating a cleaning trajectory of a home cleaning robot that includes at least one sound wave receptor by using a docking station that includes at least one sound wave transmitter, the method comprising:
controlling the home cleaning robot to travel in a straight direction, substantially perpendicular to a barrier to which the docking station is attached, as much as a set distance from the docking station and then to rotationally travel, maintaining the set distance from the docking station, until the home cleaning robot reaches one of a leftmost barrier and a rightmost barrier with respect to the straight direction;
controlling the home cleaning robot to travel as much as the set distance along the one of the leftmost barrier and the rightmost barrier if the home cleaning robot reaches the one of the leftmost barrier and the rightmost barrier and resumes rotational-traveling around the docking station, maintaining a distance between the docking station and the home cleaning robot increased by the set distance until the home cleaning robot reaches the other one of the leftmost barrier and the rightmost barrier; and
repeatedly controlling the home cleaning robot to travel as much as the set distance along the one of the leftmost barrier and the rightmost barrier if the home cleaning robot reaches the one of the leftmost barrier and the rightmost barrier and resume rotational-traveling around the docking station, maintaining a distance between the docking station and the home cleaning robot increased by the set distance until the home cleaning robot reaches the other one of the leftmost barrier and the rightmost barrier until the home cleaning robot arrives at a point where the home cleaning robot cannot travel in a direction in which a distance between the docking station and the home cleaning robot increases.

23. The computer readable medium according to claim 22, wherein the distance between the docking station and the home cleaning robot is calculated based on a difference between a time when the sound wave transmitter transmits a sound wave and a time when the sound receptor receives the sound wave transmitted from the sound wave transmitter.

24. The computer readable medium according to claim 22, wherein if an obstacle is sensed at a point while the home cleaning robot rotationally travels, the home cleaning robot travels as much as a predetermined distance along the obstacle, and if the predetermined distance is not less than the set distance, the home cleaning robot rotationally travels, maintaining a distance from the docking station equal to the set distance plus a distance between the docking station and the home cleaning robot at the predetermined point where the obstacle had been sensed.

25. A mobile robot comprising:
at least one sound wave receptor to receive a sound wave transmitted from at least one sound wave transmitter located at a designated location;
a distance calculator to calculate a distance between the designated location and the robot by using a difference between the time when the sound wave transmitter transmits a sound wave and the time when the sound wave receptor receives the sound wave transmitted from the sound wave transmitter; and
a travel controller to receive the distance between the designated location and the robot from the distance calculator, to control the robot so that the robot travels in a straight direction, substantially perpendicular to a barrier at the designated location, as much as a set distance from the designated location, rotationally travels maintaining the set distance with the designated location until reaching one of a leftmost barrier and a rightmost barrier with respect to the straight direction, straightly travels as much as the set distance along the one of the leftmost barrier and the rightmost barrier, and resumes to resume rotational-traveling maintaining a distance between the designated location and the robot increased by the set distance until reaching the other one of the leftmost barrier and the rightmost barrier.

26. The mobile robot of claim 25, wherein the travel controller outputs an angular velocity command by using a difference between the designated location and the robot, received from the distance calculator, and a predetermined distance that the robot is supposed to maintain from the designated location when following a predetermined trajectory, such that the robot returns to the predetermined trajectory.

27. The mobile robot of claim 25, wherein the travel controller receives a calculated distance $R_m$ between the designated location and the robot from the distance calculator, compares a calculated distance R with the distance $R_m$ that the robot is to maintain from the designated location at a predetermined location, and shifts an angular velocity $w(t)$ of the robot based on whether or not $R_m$ is larger than R.

28. The mobile robot of claim 26, wherein if the robot senses an obstacle at a predetermined point during the traveling trajectory, the robot travels as much as a predetermined distance along the obstacle, and if the predetermined distance is not less than the set distance, the robot rotationally travels, maintaining a distance from the designated location equal to the set distance plus a distance between the designated location and the robot at the predetermined point where the obstacle had been sensed.

29. The mobile robot of claim 25, further comprising:
a time synchronization signal receptor to receive a time synchronization signal.

30. The mobile robot of claim 25, further comprising:
a timer to generate the same timing signal as that provided from the designated location.

31. The mobile robot of claim 25, wherein the sound wave is an ultrasonic wave.

32. The mobile robot of claim 29, wherein the time synchronization signal is one of an infrared signal and a radio frequency signal.

33. The mobile robot of claim 25, wherein the sound wave receptor included in the robot is an all-directional sound wave sensor.

34. The method of claim 8, wherein a program enabling the method is recorded on a computer-readable recording medium.

35. The mobile robot of claim 13, wherein if the mobile robot senses the obstacle at a predetermined point, the mobile robot travels as much as a predetermined distance along the obstacle, and if the predetermined distance is less than the set distance, the mobile robot is controlled to travel along the obstacle until it arrives at a point where a distance between the docking station and the mobile robot is the same as a distance between the docking station and the mobile robot at the predetermined point where the obstacle has been sensed and then rotationally travels maintaining a distance between the docking station and the mobile robot.

36. The computer readable medium according to claim 22, wherein if an obstacle is sensed at a point while the home cleaning robot rotationally travels, the home cleaning robot travels as much as a predetermined distance along the obstacle, and if the predetermined distance is less than the set distance, the home cleaning robot is controlled to travel along the obstacle until the home cleaning robot arrives at a point where a distance between the docking station and the home cleaning robot is the same as a distance between the docking station and the home cleaning robot at the predetermined point where the obstacle has been sensed and then rotationally traveling maintaining a distance between the docking station and the home cleaning robot.

37. The apparatus of claim 25, wherein if the robot senses an obstacle at a predetermined point during the traveling trajectory, the robot travels as much as a predetermined distance along the obstacle, and if the predetermined distance is less than the set distance, the robot is controlled to travel along the obstacle until it arrives at a point where a distance between the designated location and the robot is the same as a distance between the designated location and the robot at the predetermined point where the obstacle has been sensed and then rotationally travels maintaining a distance between the designated location and the robot.

* * * * *

UNITED STATES PATENT AND TRADEMARK OFFICE
CERTIFICATE OF CORRECTION

PATENT NO. : 7,860,608 B2
APPLICATION NO. : 10/819984
DATED : December 28, 2010
INVENTOR(S) : Hyoung-ki Lee et al.

It is certified that error appears in the above-identified patent and that said Letters Patent is hereby corrected as shown below:

Column 12, Line 58, In Claim 15, delete "Rm" and insert --$R_m$--, therefor.

Column 12, Line 60, In Claim 15, delete "Rm" and insert --$R_m$--, therefor.

Column 12, Line 63, In Claim 15, delete "Rm" and insert --$R_m$--, therefor.

Signed and Sealed this
Twenty-sixth Day of April, 2011

David J. Kappos
*Director of the United States Patent and Trademark Office*